United States Patent

Scheibel

[15] 3,652,994

[45] Mar. 28, 1972

[54] SELECTIVE CONTROL SYSTEM FOR SLIDE PROJECTORS

[72] Inventor: Josef Scheibel, Ober-Morlen, Germany

[73] Assignee: Braun Aktiengesellschaft, Frankfurt am Main, Germany

[22] Filed: Oct. 23, 1969

[21] Appl. No.: 868,816

[30] Foreign Application Priority Data

Oct. 26, 1968 Germany ......................P 18 05 384.4

[52] U.S. Cl. .......................340/147 R, 340/147 P, 353/103, 307/115

[51] Int. Cl. .........................................................H04q 9/00

[58] Field of Search .........................340/147, 166, 325, 339; 307/115; 318/567, 569; 40/52; 353/25, 48, 68, 71, 89, 94, 103, 106, 122

[56] References Cited

UNITED STATES PATENTS

| | | | |
|---|---|---|---|
| 3,552,037 | 1/1971 | Stern | 340/339 X |
| 3,134,064 | 5/1964 | Narbro | 340/147 P |
| 3,139,793 | 7/1964 | Bradford et al. | 353/48 |
| 3,178,699 | 4/1965 | Burton | 340/337 |
| 3,282,155 | 11/1966 | Cleary et al. | 353/94 X |
| 3,308,718 | 3/1967 | Antos | 353/89 |
| 3,309,163 | 3/1967 | White | 353/94 X |
| 3,502,945 | 3/1970 | Bentley et al. | 340/166 X |

*Primary Examiner*—Donald J. Yusko
*Attorney*—Michael S. Striker

[57] ABSTRACT

A selector switch is furnished for each of a plurality of slide projectors. The switch may be closed either manually or through a corresponding feeler operating in conjunction with a punched tape. This causes the selective slide projectors to be set for a slide change. A control signal then causes all selected slide projectors to change slides simultaneously. A synchronizing system is furnished for synchronizing the transport of the tape to the end of the control signal for an automatically controlled slide show.

21 Claims, 5 Drawing Figures

United States Patent
Scheibel
[15] 3,652,994
[45] Mar. 28, 1972
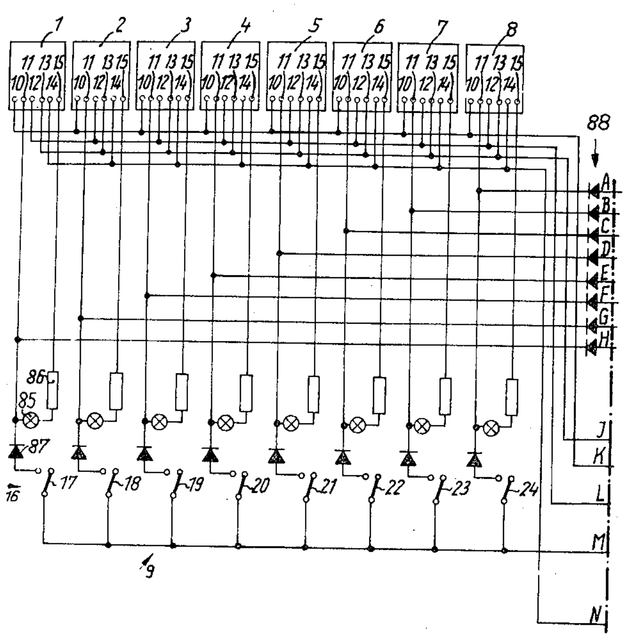

PATENTED MAR 28 1972 3,652,994

INVENTOR
JOSEF SCHEIBEL

ATTORNEY

INVENTOR
JOSEF SCHEIBEL

ATTORNEY

INVENTOR
JOSEF SCHEIBEL

ATTORNEY

SELECTIVE CONTROL SYSTEM FOR SLIDE PROJECTORS

BACKGROUND OF THE INVENTION

This invention relates to a control system for the selective control of a plurality of slide projectors.

The simplest arrangement for showing a slide program in conjunction with accompanying audio comment, as audio-visual instruction, for example, comprises an automatic slide projector for projecting slides onto a screen, a tape recorder, and manually operable slide changing control equipment. The slide changing control equipment may for example be a remote control switch which causes the slides to be changed in accordance with the audio presentation furnished by the tape recorder.

When it is desired to project slides onto a plurality of screens, a so-called multi-vision arrangement, it is necessary to provide automatic control for projectors, since the demand on the skill and concentration of the person giving the slide performance increase excessively with increasing number of slide projectors.

Of all the known automatic projection control systems, as for example mechanical control via cams or controls through frequency selection, the punched tape or punched card type of control has been found the most advantageous, since it can be accomplished without too much mechanical equipment and may be used to control an almost unlimited number of slide projectors.

In the conventional punched tape or punched card type of control systems, a program control apparatus is furnished which, in response to electrical or light pulses, furnishes the output which activates the different projectors. This has the drawback that the original control pulse, namely the electrical pulse or the light pulse do not directly cause the activation of the slide projectors. The signals must first be processed in a program control apparatus. This processing not only results in a delay, but also restricts the pulse frequency and the pulse width to within relatively narrow boundaries, thus making it impossible to change the slides sufficiently rapidly for the presentation of special effects, as for example a simulation of movement, or the generation of different color nuances.

The delay between the original control signal and the signal furnished by the program control apparatus also makes it more difficult to effect the synchronization between the slides being shown and the taped audio comment.

SUMMARY OF THE INVENTION

This invention comprises a control system for operating a plurality of slide projectors selectively. It comprises slide changing means in each of the projectors, each adapted to operate in response to a slide changing or control signal. It further comprises control signal furnishing means, and selector means for establishing a signal path from the control signal furnishing means to each selected projector. A control signal furnished by the signal furnishing means after the slide projectors have been selected, thus activates all selected ones of the projectors.

Thus the activation of the selected projectors takes place in direct response to the control pulse, so that the slide change can begin substantially at the beginning of the control pulse. Further, the pulse width and the pulse frequency of the control pulses may be varied over a wide range.

The delay between the slide changing and the generation of the control signal is of course also eliminated, simplifying the synchronization problem.

Further, the pulse sequence plan in accordance with which control pulses are to be entered onto the tape does not have to be set up by use of all slide projectors, but may be effected by use of a single slide projector only. This permits working in a relatively small room with a minimum of noise.

In a preferred embodiment of this invention the control signal furnishing means may comprise pulse furnishing means having a switch which closes a circuit, causing energization of the selected slide projector. The switch may be manually operable, or it may be an electronic switch operable in response to an activation signal, furnished, for example, by the tape of a tape recorder.

The selector means may, for example, comprise a plurality of manually operable switches, each adapted to close the circuit branch leading to the selected slide projector. Alternatively, for an automatically controlled presentation, the selector means may comprise program signal furnishing means and a plurality of additional switching means operating in conjunction with said program signal furnishing means. The additional switching means would each serve the same function as the corresponding manually operable switch in the above-mentioned embodiment.

For a completely automatic presentation, all slide projectors may be reset to the original starting position either by means of a manually operable reset switch or by means of a mark entered upon the program signal furnishing means which causes the reset signal to be applied to all slide projectors.

Further, auxiliary equipment associated with individual slide projectors may be selectively energized by the system in accordance with this invention either during the slide presentation or during the pauses in the program causes by the resetting of the slide changer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

The preferred embodiment of the present invention will now be described in relation to the Figures. It should be noted that the circuit diagram of the control system has been divided into two parts, namely FIGS. 1 and 2 for purposes of clarity. The outputs labeled A to N in FIG. 1 are actually directly connected to the corresponding inputs in FIG. 2.

Figure 1:
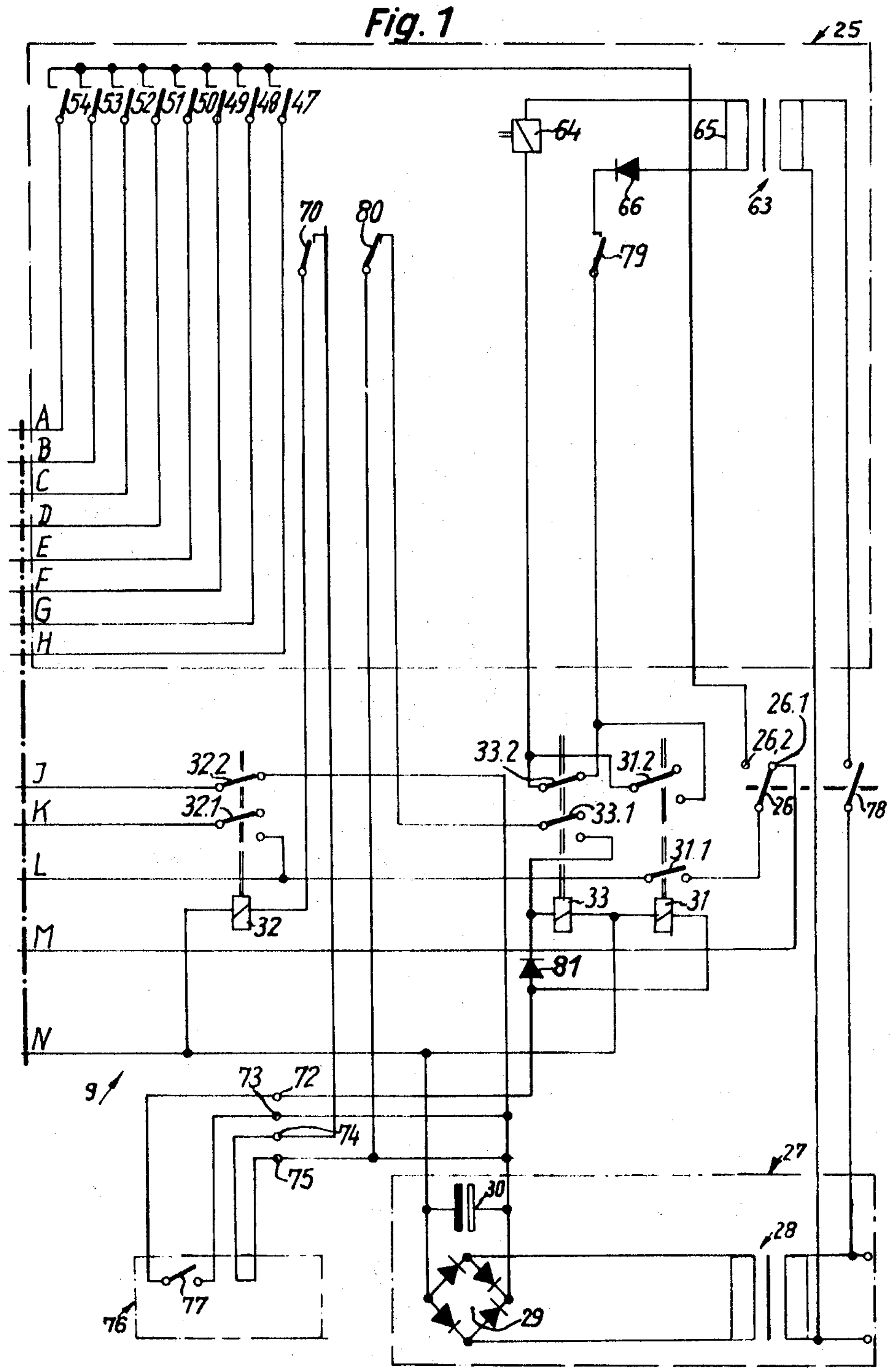
FIG. 1 and FIG. 2 show the electrical circuit diagram of the control system of this invention.
Figure 2:
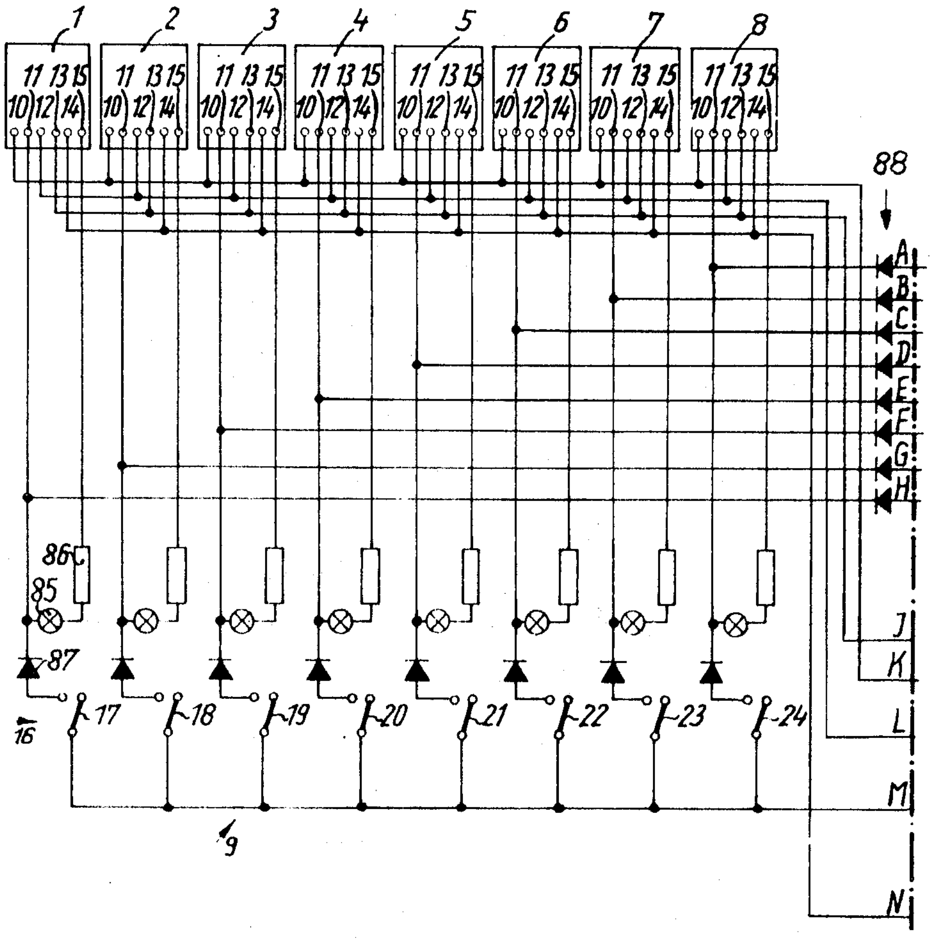

In FIGS. 1 and 2 taken in conjunction, eight slide projectors numbered 1 to 8 are shown, which are connected to the control arrangement, 9. Each slide projector has six terminals labeled 10, 11, 12, 13, 14 and 15. Connection of terminal 11 to terminal 12 in a slide projector causes the activation of the slide changing means to effect a complete slide change, while connection of terminals 10 to 12 initiates the resetting of the slide changing means to the initial position.

The control arrangement 9 is adapted for two types of operation alternatively, namely manual operation and automatic operation. For manual operation, a row of manually operable switches, 16, comprising switches 17, 18, 19, 20, 21, 22, 23 and 24, namely one for each of the projectors, is provided. For automatic operation program signal furnishing means comprising the tape of FIG. 3 and the switches 47 to 54 of FIG. 1 are supplied. The type of operation may be selected by means of a switch 26, the position 26.1 is selected for manual operation and the position 26.2 corresponds to automatic operation.

A source of electrical energy 27 is also a part of the control arrangement and comprises a transformer 28, rectifier means 29 and a filter condenser 30.

The control arrangement 9 comprises a relay 31, a first relay, with associated switching contact 31.1 and 31.2. It is one of the functions of this relay to effect the slide change in all selected projectors in response to the control signal. It further comprises a relay 32 having associated switch contacts 32.1 and 32.2, for controlling the resetting of the slide changers associated with the projectors. Lastly a second relay 33 is connected in parallel to relay 31 and has associated switching contacts 33.1 and 33.2 for controlling the automatic operation, by controlling the transport of the punched tape shown in FIG. 3. Activation of relay 31 causes the switch contact 31.1 to close, thus effecting the connection of terminals 11 and 12 of the slide projector. Activation of relay 32 causes the closing of contacts 32.1, in turn adapted to connect the terminal 10 in each slide projector to terminal 12 of the same slide projector.

Figure 3:
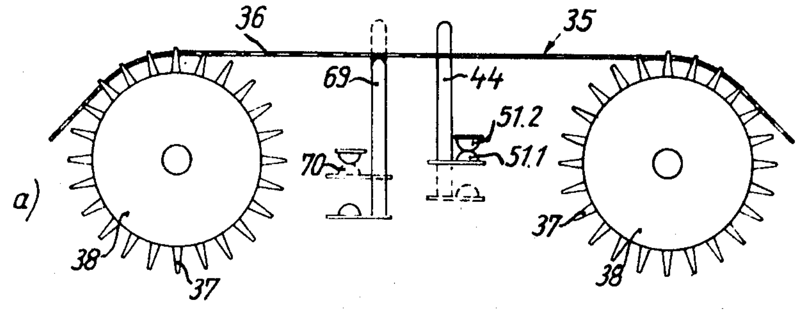
FIGS. 3, 3*a* shows one embodiment of the program signal furnishing means.
Figure 3A:
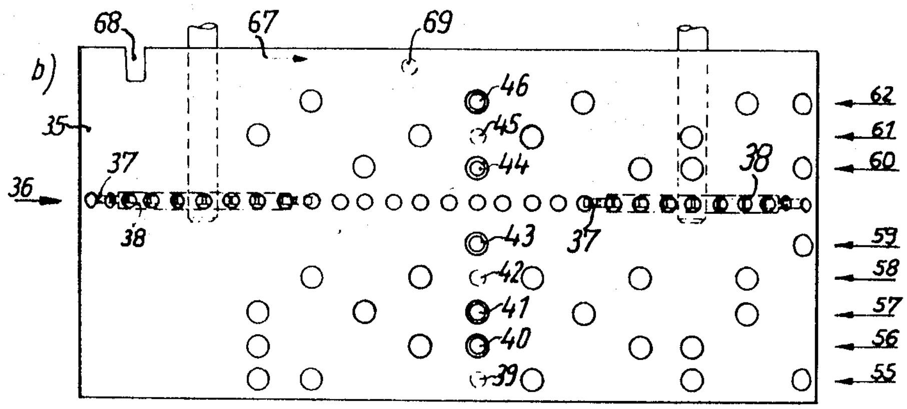

The program signal furnishing means may comprise a punched tape 35 as shown in FIG. 3. This punched tape 35 has a perforation 36 into which the teeth 37 of two transport wheels 38, which transport the punched tape engage. This engagement is shown in FIG. 3*a* in which the program signal furnishing means is shown in a sectional view along the length of the tape. The perforations in the tape, or holes in the tape, are sensed through feelers 39, 40, 41, 42, 43, 44, 45 and 46, each of which is connected to a movable contact 47.1, 48.1, 49.1, 50.1, 51.1, 52.1, 53.1, and 54.1 of switches 47, 48, 49, 50, 51, 52, 53 and 54 respectively in such a manner that each hole in the tracks 55, 56, 57, 58, 59, 60, 61 and 62 of the punched tape 35 causes the closing of the associated switch. The closing of switches 47 to 54 is effected by the entrance of the feeler into the hole situated above by use of a spring which is not shown, whereby the associated movable contact 47.1 etc. then touches the fixed contact 47.2 etc. of switch 47 to 54. Each of the switches 47 to 54 is associated with one of the projectors to be controlled.

Figure 3B:
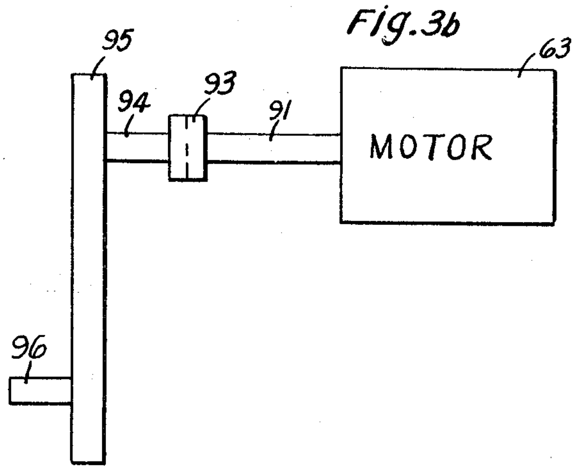
FIG. 3*b* shows the motor and associated shafts driving said program signal furnishing means.

The motor shown in FIG. 1 as number 63 drives the transport wheels 38 on a shaft 96 through a gear arrangement 95, all shown in FIG. 3*b*. In order to effect the scanning, the punched tape 35 is stopped relative to the feelers 39 to 46 by means of an electrically controlled magnetic brake 64. Thus the motor 63 continues to run, the shaft 91 of the motor being connected with the transport wheels 38 by means of a slipping clutch 93. An additional winding 65 of motor 63 delivers a secondary voltage which, after rectification through diode 66, activates the magnetic brake 64.

For the program step following the last slide change in the show being given, a mark 68 is affixed to the edge 67 of punched tape 35. This edge is normally without perforation. A feeler 69, under spring power, is normally depressed by means of the edge of the tape 67, thus causing a contact 70 to be opened throughout the running of the show. After the last slide change, the contact 70 is closed by feeler 69, since this feeler enters into the perforation or mark 68.

For automatic control of a slide projector show, a tape recorder 76 may be connected to terminals 72, 73, 74 and 75. Control pulses entered upon this tape previously, then serves to activate switch 77 which connects terminal 72 directly to terminal 73. Terminals 74 and 75 are short circuited, which may for example be effected in the cable connecting the control arrangement to the tape recorder.

The show to be presented may be planned as follows. The sequence of slides which it is desired to show, that is the sequential operation of the projectors may be determined by manual operation of the control arrangement 9. For this purpose a manually operable momentary switch may be connected between terminals 72 and 73 instead of the tape recorder 76. This manual operation allows the furnishing of control pulses in arbitrary sequence. Terminals 74 and 75 remain open.

For manual operation, switch 26 is in the position 26.1, which is illustrated in FIG. 1. The switch 26 is coupled to a switch 78 which furnishes the energization of the program signal furnishing means in such a way that switch 78 is open when switch 26 is in the position 26.1, thus interrupting the energization of the program signal furnishing means. Each program step in the show is determined by the activation of selected ones of the switches 17 to 24. Of course these switches may also be keys.

If, for example, at a given point in the show, the projectors 2, 5, and 8 are to undergo a slide change, then switches 18, 21 and 24 are depressed. The following control pulse then closes switch 77 thus briefly connecting the relays 31 and 32 to the source of electrical energy 27. The current flowing through relay 31 causes the closing of the switch contact 31.1, thus connecting terminals 11 and 12 of projectors 2, 5 and 8, thus causing a slide change to be started in these projectors. The slide changing is continued by means of an additional, cam controlled switch in each individual slide projector even after this connection has been broken because of the opening of switch 77 and the deactivation of relay 31.

Since no punched tape is in the program signal furnishing means, and in order to keep the contact 70 closed, a resetting of the projector magazine is effected by connecting terminal 74 to terminal 75. When relay 32 is activated, the associated switching contacts 32.1 close, thus furnishing a direct connection of terminals 10 to terminals 12 of slide projectors, thus initiating the return to the original position in all slide changes. The return movement of the slide magazine is also continued by means of a cam-controlled switch which is not shown, after this connection from terminal 10 to terminal 12 is broken. Each projector may further be furnished with a separate terminal switch which causes the magazine return to be stopped after the initial position has been reached.

After the sequence of projectors to be operated has been determined and noted (thus constituting a so-called optical script), the tape 35 is punched in accordance with this optical script.

If the optical script is completed by means of the addition of a time scale, then corresponding signals may be entered upon the tape, which may have music or sound effects, to effect a synchronous operation of the sound and the visual material.

Thus the requirements for an automatically operated slide show including sound accompaniment have been met.

For automatic operation, the switch 26 is put to the position 26.2, closing switch 78 and furnishing current to the program signal furnishing means 25. Instead of the manually operable switch 77, a tape recorder 76 is connected to the terminals 72, 73, 74 and 75. For automatic operation, the selector means which prepare the slide projectors for the next slide change comprise switches 47 to 54 arranged in a row perpendicular to the direction of transport of the punched tape 35. The typical punched tape 35 shown in FIG. 3 comprises eight tracks 55 to 62. The switches 47 to 54, respectively associated with projectors 1 to 8 cooperate with the feelers designed to sense the holes in the respective tracks.

If for example at the next slide change, the projectors 3, 4 and 7 are to undergo a slide change, then switches 49, 50 and 53 are closed while switch 47, 48, 51, 52 and 54 remain open. The actual slide changing is effected through the closing of contacts 31.1 of relay 31, as was described in the example under manual operation. The return movement of the slide magazine of the projectors is effected by the closing of the contact 70 due to the perforation 68 at the end of the program stored in the punched tape 35.

The intermittent transport of the punched tape 35 is controlled by the magnetic brake 64 in such a manner that the transport towards the next set of holes begins immediately upon termination of the preceding control pulse. Thus the tape is advanced while the slide changing is still taking place. In order to effect this operation, a pair of relay contacts 31.2 associated with relay 31 are furnished in the circuit of the magnetic brake 64. Further, a pair of relay contacts 33.2, associated with relay 33 are connected in parallel to the contacts 31.2. Further, the circuit of the magnetic brake 64 comprises a switch 79, connected in series to the parallel combination of relay contacts. In this manner, the circuit energizing the magnetic brake 64 is opened only when relay 31 is inactivated and simultaneously relay 33 is activated and/or if switch 79 is open. Of course under conditions of an open circuit in the circuit of the magnetic brake, the tape transport takes place.

At the end of the control pulse, relay 31 is immediately deenergized, while relay 33 is kept energized by a holding circuit comprising switch 80. Thus the circuit of magnetic brake 64 is opened and the transport of the punched tape begins. A diode 81 decouples relay 33 from relay 31.

Switches 79 and 80 are activated by cam shaft 94 of the motor 63, (FIG. 3b). This shaft undergoes a full revolution for each transport step. The shaft is connected to the motor by means of a slipping clutch 93 and is driven by the motor only during the time of transport of the punched tape. The shape of the cams is such that shortly after the beginning of the rotation of this shaft the switch 79 opens and does not close until shortly before the shaft returns to its initial position. Switch 80 is opened shortly after switch 79 for a brief period of time and remains closed for the remaining rotation of the shaft.

Thus when relay 33 becomes deenergized due to opening of switch 80, the circuit of the magnetic brake remains open by means of switch 79 until the punched tape has reached the position for preparing for the next slide change.

In order to make the operation fully automatic, the source of energy 27 is connected via contacts 32.2 of relay 32 to terminals 13 and 14 of the projectors 1 to 8. This allows auxiliary equipment as for example a projection lamp to be energized during the program and to be deenergized at the end of the program automatically.

If a voltage is supplied within the projectors at terminals 12 and 15, an optical control of the slide changes in the projectors may be obtained by use of the control lamps 85 in series with a current limiting resistance 86 which are connected between the terminals 11 and 15 of projectors 1 to 8.

The coupling diodes 87 and 88 respectively serve to prevent voltage feedback between the activated and the inactivated projectors under manual and automatic operation respectively.

If, instead of projectors which execute a full slide change in response to a pulse, projectors are used which, for the time duration of a pulse, only operate to put the magazine into the free position and initiate the second half of the slide change only at the end of the pulse, then it is possible to vary the interval between slides by extending the length of the control pulse.

Further, projectors are available which transport the magazine in a forward or reverse direction in dependence on the pulse width of the control pulse.

While the invention has been illustrated and described as embodied in a control system using a punched tape, it is not intended to be limited to the details shown, since various modifications and structural and circuit changes may be made without departing in any way from the spirit of the present invention.

What is claimed as new and desired to be protected by Letters Patent is set forth in the appended claims.

I claim:

1. Slide program control system, comprising, in combination, a plurality of slide projectors each having slide changing means, each of said slide changing means having a first and second terminal and changing slides in response to the completion of a circuit between said first and second terminals; a plurality of selector means each connected to a corresponding one of said slide changing means and operable independently of the others of said selector means to complete a circuit from said first terminal of said corresponding one of said slide changing means to a common line upon external activation; control signal furnishing means; and means for completing said circuit from said common line to all of said second terminals upon receipt of said control signal, thereby operating all of said slide changing means corresponding to externally activated ones of said selector means substantially simultaneously.

2. An arrangement as set forth in claim 1, wherein said control signal furnishing means comprise pulse furnishing means.

3. A control system as set forth in claim 2, wherein said pulse furnishing means comprise a source of electrical energy; and switching means adapted to connect said source of electrical energy to said means completing said circuit upon activation.

4. A control system as set forth in claim 3, wherein said switching means comprise a manually operable momentary switch.

5. A control system as set forth in claim 3, wherein said switching means comprise electronic switching means responsive to an activation signal; further comprising signal carrier means for furnishing said activation signal.

6. A control system as set forth in claim 1, wherein said selector means comprise a plurality of manually operable switches.

7. A control system as set forth in claim 1, wherein said selector means comprise a plurality of additional switching means, each operable in response to a corresponding program signal; further comprising program signal furnishing means for furnishing said program signals, said program signals thereby constituting said external activation.

8. A control system as set forth in claim 7, wherein said program signal furnishing means comprises a punched tape; further comprising transport means transporting said tape in a determined direction.

9. A control system as set forth in claim 8, wherein said punched tape is transported intermittently, said program signals being furnished in advance of each control signal.

10. A control system as set forth in claim 9, wherein said punched tape has a plurality of holes arranged in rows in a direction perpendicular to said determined direction; further comprising a plurality of feelers arranged in the direction of said rows for sensing said holes.

11. A control system as set forth in claim 10, wherein said transport means comprise a magnetic brake; further comprising means for energizing said magnetic brake, thus causing stoppage of said tape, when said feelers are in the rest position relative to a row of holes.

12. A control system as set forth in claim 11, further comprising means for deactivating said magnetic brake after receipt of a control signal.

13. A control system as set forth in claim 12, wherein said transport means further comprise a motor, said motor having a shaft; cam means mounted on said shaft for rotation therewith; and wherein said means for deactivating said magnetic brake comprise a first relay having a first pair of relay contacts adapted to open the circuit of said magnetic brake when said relay is energized, said relay being energized by said control pulses, said relay having a holding circuit for continuing the energization of said relay after termination of said control pulse, said holding circuit including a switch activated by said cam means; said means for deactivating said magnetic brake further comprising a second relay having a pair of normally open contacts connected in parallel with the pair of contacts of said first relay, said second relay being adapted to be energized by said control pulses; said means for deactivating said magnetic brake further including a second switch, connected in series to the parallel combination of relay contacts, and activated by said cam means.

14. A control system as set forth in claim 13, wherein said cam means undergo one rotation during transport of said punched tape from one row of holes to the subsequent row of holes.

15. A control system as set forth in claim 1, further comprising means for returning all of said slide changing means to the starting position upon receipt of a reset signal.

16. A control system as set forth in claim 15, further comprising manually operable means for furnishing said reset signal.

17. A control system as set forth in claim 15, further comprising automatic means for furnishing said reset signal.

18. A control system as set forth in claim 1, further comprising auxiliary equipments, each associated with one of said slide projectors; and means for selectively energizing said auxiliary equipment.

19. A control system as set forth in claim 18, wherein said auxiliary equipments comprise control lamps; and wherein said means for selectively energizing said auxiliary equipment comprise means for energizing said control lamp during the changing of slides.

20. A control system as set forth in claim 1, further comprising decoupling means in each of said circuits for decoupling each of said slide changing means from the others of said slide changing means.

21. A control system as set forth in claim 20, wherein said decoupling means are diodes.

* * * * *